Figures 1, 2:
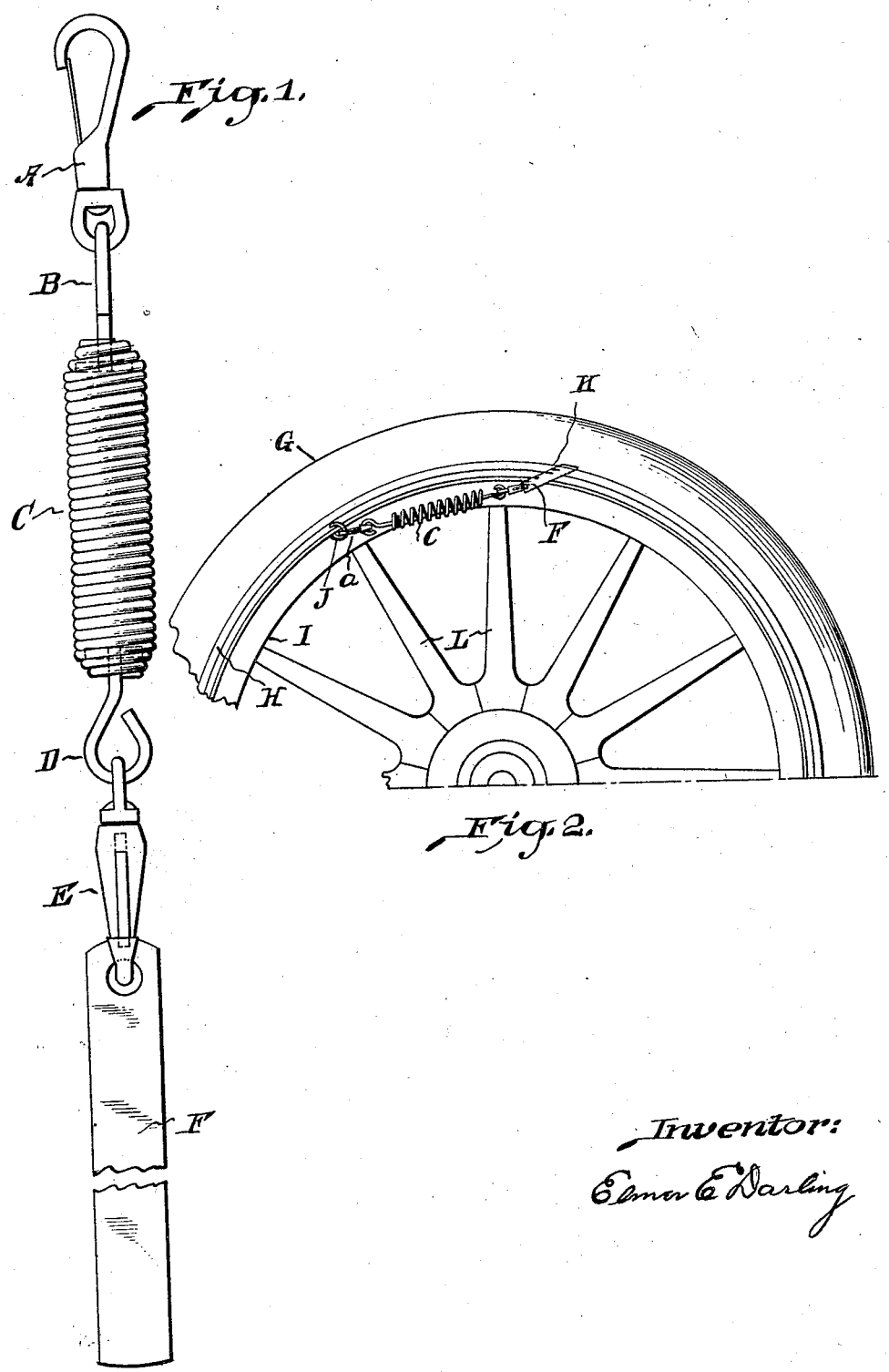

Apr. 10, 1923.

E. E. DARLING
TIRE ALARM

Filed June 14, 1920

1,451,291

Inventor:
Elmer E Darling

Patented Apr. 10, 1923.

1,451,291

UNITED STATES PATENT OFFICE.

ELMER E. DARLING, OF SALT LAKE CITY, UTAH.

TIRE ALARM.

Application filed June 14, 1920. Serial No. 389,049.

*To all whom it may concern:*

Be it known that I, ELMER E. DARLING, a citizen of the United States, and a resident of Salt Lake City, in the county of Salt Lake and State of Utah, have invented a new and useful Improvement in a Tire Alarm, as described in the following specification and illustrated in the accompanying drawings, that form part of the same.

The present invention relates to tire alarms more particularly for use on pneumatic tires for automobiles and trucks.

The principal objects of this invention are to give warning of the loss of air in a pneumatic automobile or truck tire; to warn the driver of an automobile against running the automobile on a pneumatic tire when the air has escaped from the tire by leakage; to prevent the destruction of the tire by running it while deflated or nearly deflated.

The principal feature of the invention consists in the novel construction and arrangement of two swivel snaps and two steel springs, one end of the device to be fastened to the rim of the automobile wheel and the other end to be inserted between the tire and the tire rim and held in place by the pressure of the air in the tire. When the pressure of the air is released or nearly released the tension of the springs is designed to release the end fastened between the tire and rim thus leaving the tire alarm fastened at the other end to the tire rim. The end thus released is brought in contact with the fender or some other part of the automobile with each revolution of the wheel; the report or noise of each contact giving warning to the driver or occupants of the car of the loss of air from tire.

One object of my invention is to provide a tire alarm that is cheap in construction and durable in service. Another object of my invention is to provide a tire alarm that will give warning of the loss of air from an automobile tire while in motion and prevent the destruction or serious injury of the tire which would result if the vehicle was kept in motion on the road after deflation or partial deflation of the tire. Another object of my invention is to provide an alarm which will give a warning when the tire is partially deflated while in use on the road.

With these and other objects in view my invention consists of the following parts, reference being had to the drawings forming a part of this application in which similar letters indicate like parts throughout the several views.

In the drawings Figure 1 is a plan view of the device practically showing it full size. Figure 2 is an elevation of a portion of an automobile wheel and tire with my device in place thereon.

The invention consists of a spiral spring C, preferably made of steel, with an eye hook B carried in one end, and a similar eye hook D carried in the other end of said spring. To provide flexibility a swivel snap A is engaged with said eye hook B, and a similar swivel snap E is engaged with the said eye hook D. A thin flat metal strip F is engaged with the snap E, and said strip E may be made of any tough metal such as brass, steel or tinned iron.

In use the devices are fastened to the wheel rims J by boring a small hole through the edge of the rim and engaging the snap A in said hole or by using a ring in the hole and engaging the said snap A in the ring. The flat strip F is inserted between the ring J and the tire K and to such distance as will tension the spring C. The tire is then inflated in the usual manner, which inflation will cause the tire to grip and hold the said strip F as long as the tire is inflated. If the tire should become partially deflated while the wheel was in use on the road, the tension of the spring will withdraw the strip F from between the tire and rim and the device will be freed at its strip end but will be held at the snap A end and the free end will be brought in contact with the fender or some other portion of the vehicle with each rotation of the wheel, and the noise of such contact will give warning to the driver of the vehicle of the loss of air from the tire.

Having thus described my invention I desire to secure by Letters Patent and claim:—

1. In a tire alarm the combination with a pneumatic tire and rim on which it is carried, of a spiral spring secured at one end by flexible connection to said rim; and a flat strip connected with the other end of said spring and adapted to have a portion of said strip held between the said tire and rim when the tire is inflated and to be released when the tire is deflated.

2. In a tire alarm the combination with a pneumatic tire and rim on which it is used, of a spring flexibly connected at one end to said rim, and a thin metal strip flexibly connected to the other end of said spring, and adapted to have a portion held between said tire and rim when the tire is inflated, and to be released by the tension of said spring and rotation of the wheel of the vehicle when the tire is deflated in order that the released portion of spring and strip may contact with parts of the vehicle as an alarm.

ELMER E. DARLING.

Witnesses:
 K. B. BUTLER,
 T. D. LEWIS.